Figure 5:
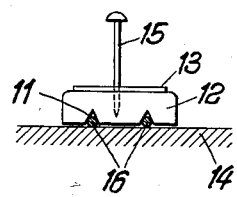

Feb. 23, 1960
C. REUTER
2,926,213
WALL INSULATOR FOR ELECTRIC LEADS
Filed May 23, 1955
2 Sheets-Sheet 1
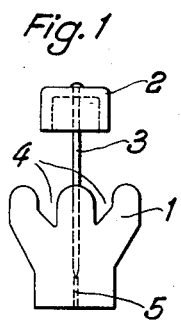
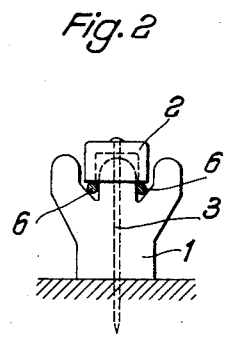
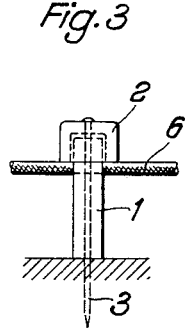
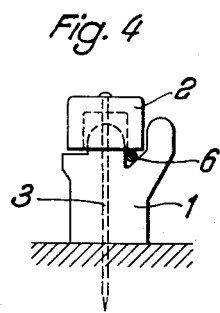

Feb. 23, 1960   C. REUTER   2,926,213
WALL INSULATOR FOR ELECTRIC LEADS
Filed May 23, 1955   2 Sheets-Sheet 2

United States Patent Office 2,926,213
Patented Feb. 23, 1960

2,926,213

WALL INSULATOR FOR ELECTRIC LEADS

Christian Reuter, Berlin-Charlottenburg, Germany, assignor to Robert Karst, Berlin, Germany Application May 23, 1955, Serial No. 510,337
In Germany November 12, 1949

Public Law 619, August 23, 1954
Patent expires November 12, 1969

1 Claim. (Cl. 174—157)

The invention relates to an insulator for insulating electric leads relatively to a wall, herein called a wall insulator.

The known wall insulators serving for fixing or laying electric leads on walls or other suppports are generally composed of a plurality of parts. They consist of a lower part and a cap-like upper part connected with each other by one or a plurality of screws. When mounting such insulators a great number of manipulations and operations must be performed by the mounting staff requiring the use of different tools. These operations require a considerable time and make it necessary to provide clamping screws and upper portions of clips. Further for fastening the insulators on the support or the wall fastening means adapted to be inserted into the clip when mounting it are required.

The wall insulator according to the present invention avoids these disadvantages and provides an insulating body comprising all details required for mounting and fastening it on the wall or the support so that, during mounting, only fastening of the insulating body at the lead to be laid is required without additional clamping screws, fastening screws and the like being necessary. Due to this construction according to the invention the new insulating body allows laying in a shorter time and excludes the loss of single parts as all parts belonging to the insulating body and required for mounting it are composed to one unit and form an undivided body for the working staff.

The insulator according to the invention consists of an insulating body of elastic material preferably polyethylene provided with recesses adapted to receive the leads and a perforation or boring extending perpendicularly to the said recesses which perforation is provided, at its recessed end, with a fastening means adhering to it, e.g. a nail. For the purpose of receiving the leads to be laid the insulating body is provided, according to the invention, with recesses corresponding to the lead or the leads.

The insulating body according to the invention unites all parts required for its mounting without the use of fastening or clamping means being necessary. For mounting it the use of only one sole tool is required i.e. a hammer. This decisive advantage over the insulators known up to now is attained thereby that an elastic material is chosen for the insulating body, said material receiving the nail serving for fastening the insulating body, in a boring so that it adheres therein and the insulating body and the fastening nail may be delivered by the manufacturer as one sole unit; thereby it is attained that the manipulations caused by the plurality of parts of the insulator and required up to now are saved when mounting it, as the insulating body according to the invention needs only be put on the wall and, after the leads are inserted into the recesses, be fastened on its support by the nail adhering to it.

The drawings show by way of example a plurality of embodiments of the wall insulator according to the invention in which Figs. 1–4 show a wall insulator having a cap clamping the leads and arranged at the fastening means, Fig. 1 showing the insulator prepared for being fastened at the wall and adapted to receive two leads, Fig. 2 shows an insulator fastened at the wall and having the lead inserted into it, Fig. 3 is a side view of the insulator according to Fig. 2, Fig. 4 shows an embodiment of the wall insulator for laying only one lead.

Figure 7:
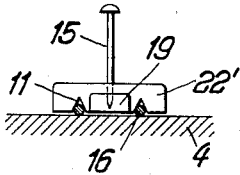
Figure 6:
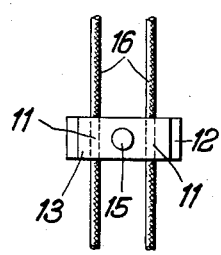
Figure 8:
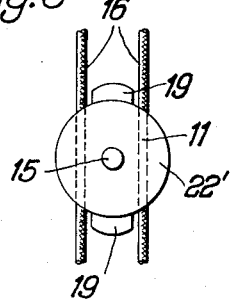
Figure 9:
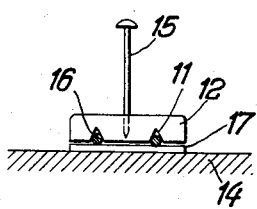
Figure 11:
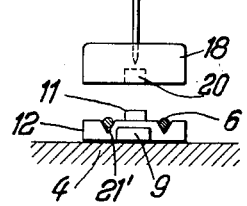
Figure 10:
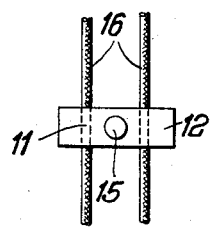
Figure 12:
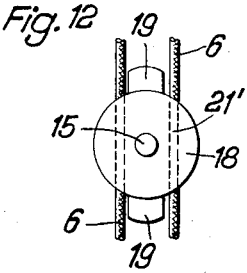

Figs. 5–12 show further embodiments of the invention in which the leads are laid immediately on the wall, Fig. 5 showing an insulating body in the form of a bridge, Fig. 6 being a plan view of Fig. 5, Fig. 7 showing an insulating body formed as a round body, Fig. 8 being a plan view of Fig. 7, Fig. 9 showing an insulating body provided with recesses directed toward the wall and a second insulating body being inserted, Fig. 10 being a plan view of Fig. 9, Fig. 11 showing an insulating body provided with recesses on the outer side the leads being fastened by a second insulating body, and Fig. 12 being a plan view of Fig. 11.

In the embodiment according to Figs. 1–3 the wall insulator consists of the fillet-like insulating portion 1, the cap 2, and the steel nail 3 firmly connected with the cap 2. The insulating portion 1 of elastic insulating material is provided, at its conductor receiving end section, with recesses 4 having an inclined bottom so that the leads inserted into said recesses are pressed by the cap 2 against the inner side of the respective recess. The insulating body portion has a hole bored in its middle from end to end and the steel nail 3 is passed through this boring. The cap 2 consists of pressed insulating material and may be connected to the steel nail simultaneously with its manufacture. The cap is shaped so as to be adapted to engage the recesses 4 thereby clamping the leads inserted into the recesses. The steel nail 3 fitting tightly in the boring of the insulating portion 1 is driven into the insulating portion 1 so far that the point of the steel nail is still covered. Therefore the insulators may be handled or kept in a person's pockets without fear of injury to the hands by the nail points. The use of a cap for holding the lead has the advantage that the cap may engage the recesses 4 in dependency of its angular position. If a corresponding fillet or bridge would be used instead of the cap its position with respect to the axis of the nail must correspond to the position of the flat insulating body 1.

For laying antenna cording only one recess 4 is required in the insulating body as illustrated in Fig. 4.

In the embodiments shown in Figs. 5 to 12 the insulating bodies consist of a suitable artificial material having a certain elasticity or being at least not too brittle. In accordance with the kind of the artificial material the insulating body may be manufactured by stamping it out of a plate or by squirting or pressing or by turning. The recesses 11 of the insulating portion are so dimensioned and formed that the lead inserted into said recesses has a somewhat larger cross section than the recess and therefore somewhat projects from the recess.

In Fig. 5 the insulating body is designated with the reference numeral 12 and the recesses with the reference numeral 11. For reinforcing the insulating body a metal plate 13 may be provided at the side opposite to the recesses 11. For fastening the insulating body 12 at the wall 14 a steel nail 15 is provided tightly fitted into a boring of the insulating body. Before fixing the insulating body to the wall the steel nail is already inserted into the insulating body suchwise that the point of the nail is protected and permeates the insulating body not before it is nailed to the wall.

As may be seen from the drawings the leads 16 are held spaced from each other and, in the embodiment according to Figs. 5 and 7, they are pressed directly against the wall. By the fillet-like configuration of the insulating body 12 according to Fig. 5 the position of the insulating body 12 relatively to the leads is a definite one; while, when using a round insulating body 22' according to Figs. 7 and 8 this is not the case. For facilitating the mounting the round insulating body 22' is provided with lugs 19 extending suitably parallel to the lead 6 and serving for keeping the leads in a spaced relationship to each other. If desired these lugs may also be arranged perpendicularly to the leads.

In order to insulate the leads relatively to the wall on which they are to be laid a further insulating portion 17 may be arranged between the insulating body 12 and the wall 14, as illustrated in Fig. 9, which insulating portion may consist e.g. of hard paper.

Should it be desired to keep the leads in a certain distance from the wall the insulator may be shaped as shown in Figs. 11 and 12. Here the recesses 21' of the insulating body 12 are provided at its side remote from the wall, and a second insulating body 18 is provided which is also permeated by the steel nail, the lower surface of which is pressed against the wires when mounting the insulator at the wall, so that the wires are clamped in the recesses. The insulating body 18 is provided with the nail 15 before being mounted and serves simultaneously as a protecting cover for the nail point. Suitably the insulating portion 18 is provided with a boring 20 serving together with a portion 22 of the insulating body 12 for centering.

The embodiments shown in the drawings are only examples of an insulating body according to the invention, to which, however, the invention is not restricted. Each insulating body consisting of elastic material comprising in itself the parts and fastening means required for its mounting so that they are united to form an undivided unit falls within the scope of the invention.

I claim:

A preformed wall insulator assembly for electric leads, comprising in combination, an insulator body of yieldable insulating material formed with a central straight perforation throughout and having two end portions, one of said end portions being provided with a conductor receiving grooved section; a straight nail for fastening said wall insulator, said nail extending partly into said insulator body through the said perforation to a position where the point is intermediate the ends of said insulator body, said nail being firmly held part way in said perforation by frictional engagement with yieldable insulating material to prevent injury, a cap element secured to the other end of said nail, said nail being of a sufficient length to allow said one end to extend through the perforation into said insulator for attaching same to a suitable support.

References Cited in the file of this patent

UNITED STATES PATENTS

| | | |
|---|---|---|
| 1,376,307 | Amos | Apr. 26, 1921 |
| 1,429,079 | Kettron | Sept. 12, 1922 |
| 1,474,736 | Schaub | Nov. 20, 1923 |
| 1,767,565 | Thrift et al. | June 24, 1930 |